US009552577B2

(12) United States Patent
Di Tucci et al.

(10) Patent No.: US 9,552,577 B2
(45) Date of Patent: Jan. 24, 2017

(54) METHOD AND APPARATUS FOR THE TRANSFER OF A MONEY AMOUNT BY USING A TWO DIMENSION IMAGE CODE

(76) Inventors: Cosmo Di Tucci, Borgo Grappa (IT); Marco Cavaterra, Genzano di Roma (IT)

( * ) Notice: Subject to any disclaimer, the term of this patent is extended or adjusted under 35 U.S.C. 154(b) by 1019 days.

(21) Appl. No.: 13/553,667

(22) Filed: Jul. 19, 2012

(65) Prior Publication Data
US 2013/0024379 A1    Jan. 24, 2013

Related U.S. Application Data

(60) Provisional application No. 61/515,011, filed on Aug. 4, 2011.

(30) Foreign Application Priority Data

Jul. 22, 2011  (IT) .............................. RM2011A0391

(51) Int. Cl.
*G06Q 20/32*    (2012.01)
*G06Q 20/10*    (2012.01)
(Continued)

(52) U.S. Cl.
CPC ............ *G06Q 20/327* (2013.01); *G06Q 20/10* (2013.01); *G06Q 20/223* (2013.01); *G06Q 20/32* (2013.01);
(Continued)

(58) Field of Classification Search
CPC ................................. G06Q 20/00; G06Q 40/00
See application file for complete search history.

(56) References Cited

U.S. PATENT DOCUMENTS

2002/0116329 A1*  8/2002  Serbetcioglu .......... G06Q 20/02
                                                                    705/39
2003/0065805 A1*  4/2003  Barnes, Jr. ............. G06Q 10/02
                                                                    709/231
(Continued)

FOREIGN PATENT DOCUMENTS

EP          1528518 A1    5/2005
EP          2073160 A1    6/2009
(Continued)

OTHER PUBLICATIONS

HSN.com ("Policy: Canceling online orders" HSN.com <http://www.hsn.com/cs/policies/default.aspx Feb. 19, 2004).*
(Continued)

*Primary Examiner* — Eric T Wong
*Assistant Examiner* — Mark Gaw
(74) *Attorney, Agent, or Firm* — Squire Patton Boggs (US) LLP

(57) ABSTRACT

The present disclosure concerns a method for transferring a money amount by using a two-dimension image code. It provides that the registration of the transfer parties affected by a managing entity generates a two-dimension image code containing registration and security data. Moreover, the request of the recipient party to the paying party of the money amount occurs by a two-dimension image code generated on the display of a mobile phone of the recipient party; the payment order of the paying party to the managing entity to pay said money amount involves the capture of the two-dimension image code from the display of the recipient party and sending to the managing party an encrypted SMS message including the data, the reception of the encrypted the SMS message by a central server of the managing party, which forwards or not the request of authorization of payment of the money amount.

13 Claims, 3 Drawing Sheets

(51) Int. Cl.
*G07G 1/00* (2006.01)
*G06Q 20/22* (2012.01)

(52) U.S. Cl.
CPC ...... *G06Q 20/3255* (2013.01); *G06Q 20/3274* (2013.01); *G06Q 20/3276* (2013.01); *G07G 1/0081* (2013.01)

(56) References Cited

U.S. PATENT DOCUMENTS

| | | | |
|---|---|---|---|
| 2007/0106564 A1* | 5/2007 | Matotek et al. | 705/26 |
| 2007/0208638 A1* | 9/2007 | Brown | 705/35 |
| 2007/0244811 A1 | 10/2007 | Tumminaro | |
| 2008/0011825 A1* | 1/2008 | Giordano et al. | 235/380 |
| 2008/0162316 A1* | 7/2008 | Rampell et al. | 705/35 |
| 2008/0222048 A1* | 9/2008 | Higgins et al. | 705/67 |
| 2010/0082444 A1* | 4/2010 | Lin et al. | 705/17 |
| 2011/0137797 A1* | 6/2011 | Stals et al. | 705/44 |

FOREIGN PATENT DOCUMENTS

| | | |
|---|---|---|
| EP | 2088548 A1 | 8/2009 |
| EP | 2128809 A1 | 12/2009 |
| EP | 2549421 A1 | 1/2013 |
| JP | 2002-109421 A | 4/2002 |
| WO | 2008/111248 A1 | 9/2008 |
| WO | 2010/071949 A1 | 7/2010 |
| WO | 2011/147566 A2 | 12/2011 |

OTHER PUBLICATIONS

International Search Report and Written Opinion in corresponding PCT application dated Sep. 5, 2013.
Extended European Search Report in corresponding application dated Oct. 25, 2012.
European Official Communication in corresponding European application dated Jul. 19, 2013.
Search Report in corresponding Italian application dated Jan. 27, 2012 with opinion partially in English.

* cited by examiner

METHOD AND APPARATUS FOR THE TRANSFER OF A MONEY AMOUNT BY USING A TWO DIMENSION IMAGE CODE

CROSS REFERENCE TO RELATED APPLICATIONS

The present invention claims the priority of the Italian patent application number RM2011A000391, filed on Jul. 22, 2011, and U.S. provisional patent application No. U.S. 61/515,011 filed on Aug. 4, 2011, which are here incorporated in their entirety by reference.

FIELD

Most of the transactions of goods or services occur today by means of bank transfers performed in the bank or "remotely" or by electronic commerce, as well as by devices called POS (Point Of Sale).

As it is known, the POS is a device utilized in the shops, which allows to accept payments by means of credit cards, debit cards and prepaid cards. The devices connected with the elaboration centre of a bank or banks group offering the service, so that the relevant debit on the current account of the enabled subject and the credit on the seller current account are authorized. In the operations with the POS, debit or credit cards can undergo data interceptions and therefore cloning; besides, there are passages from hand to hand which imply that the seller gains knowledge of the personal details of the buyer.

Japan patent application number JP 2002109421A tries to overcome this drawbacks by providing a money transfer method and relevant system which provide the use of a cellular phone.

In an embodiment of the method according to the above-mentioned Japan patent application, the POS is a two-dimension code identifying a money amount to be paid on a terminal screen; the mobile phone of the buyer captures, using its camera, the product code from the POS and sends a payment request to the transfer terminal of the bank. The transfer terminal of the bank sends the required bank transfer to the POS and to the mobile phone together with information that the bank transfer has been effected. One understands that with the transfer method and system according to the above-mentioned patent application, the need of having at disposal an electric network and a fixed telephone network can disappear if one uses the so-called POS GSM/GPRS, which integrate the functions of a POS with those of the mobile phone and is used mainly by shopkeepers who have a necessity to move such as taxi drivers, street vendors or by those who are reached by a telephone line; however, there remains the need of a POS and the use of debit or credit cards, with all the relevant drawbacks.

Owing to the fact that transfer system according to the Japan patent application requires that the money recipient party is provided with a POS, it does not allow to private subjects without a POS to carry out a sale and a corresponding purchase of a good or service. Otherwise, the paying party should be provided with a credit or debit card.

Document US2008222048 describes a payment system wherein there are information fluxes between three parties of the transaction: the seller (with his POS), the buyer (with his mobile phone), and a server of the payment system (bank or similar). The seller, when he has to carry out a transaction for selling one or more products, requires, by POS, a bar code to the payment system managed by the server. The server sends the bar code to the POS of the seller. At this point, the seller prints and provides it to the buyer, who captures the bar code by a mobile device and sends, by SMS, to the same server. An information exchange begins to verify the identity of the buyer. Once such an identity is verified, the server sends to the seller a notification of effected payment, with which the seller can close the sale and deliver the goods and purchase receipt. This method has the drawback that it needs the use of the POS and occupies the server with many information exchanges, what can be critical in some periods in the year because of the enormous amount of required transactions.

OBJECT

An object of the present disclosure is to allow the transfer of a money amount by using a two dimension image code, the transfer having characteristics of efficiency, security and privacy compliancy that cannot be reached with the prior art.

In particular, an object of the present disclosure is to allow the transfer of a money amount between two persons, wherein the seller, i.e. the one that should be paid, does not have a POS at its disposal. Moreover, an object of the present invention is to allow the transfer of a money amount between two persons, wherein the buyer does not have a credit or debit card.

SUMMARY

The above-mentioned objects are substantially achieved by the present disclosure that in a first aspect provides a method for transferring a money amount by using a two-dimension image code between a paying party provided with a payment device and a recipient party provided with a reception payment device, comprising:
  A. Registration of both paying party and recipient party at a money transfer managing entity on a server, which provides for the management and verification of the paying party and recipient party and is responsible of the authorization to the transfer of money amounts and their payment;
  B. Request of the recipient party to the paying party of a money amount, executed between the reception payment device and the payment device;
  C. order from the paying party to the money transfer managing entity to pay said money amount to the recipient party, after the insertion of a authorization PIN in the payment device and information communication from the payment device to the server;
  D. authorization to the payment from the transfer managing entity to the recipient party, with information communication from the server to the reception payment device;
  E. payment of said money amount to the recipient party and sending of a confirmation information of effected money amount transfer to the payment device and reception payment device concerning the effected payment of the money amount, or possible writing off or cancellation of an already effected payment operation;
The method being characterized in that said payment device and said reception payment device are mobile phones, and in that:
  in step B, the recipient party generates a two-dimension image code on the display of the reception payment mobile phone;
  in step B, the payment mobile phone of the paying party captures the two-dimension image code from the display of the recipient party mobile phone;

in step C, the paying party sends to the server via the payment mobile phone an encrypted authorization SMS message, the encrypted authorization SMS message including data contained in the two-dimension image code, comprising the indication of said money amount, in step D, the server receives said encrypted authorization SMS message and authorizes or not the payment of the money amount, the recipient party mobile phone of the recipient party restricting itself in step B to the visualization of said two-dimension code, without sending any relevant information to the money transfer managing entity.

According to an aspect of the invention, in case of authorization to the payment in step D, the server sends a confirmation of effected payment by means of two confirmation SMS, one directed to the payment mobile phone and the other one directed to the reception payment mobile phone.

According to an aspect of the invention, the registration of step A of the paying party and the recipient party on the server of the money transfer managing entity includes the generation by the server of relevant unique codes called user-ID and assigned to the same paying party and recipient party, the definition of personal details data, account data, payment modes and payment limits, the type of user account, i.e. prepaid or credit card, the request of a ID-SMS utilized for validating the authorization SMS during the authorization to the payment, definition of an alteration code to generate an authorization PIN and an alteration method used to encrypt a protection key for the PIN, generation of a random key to protect the PIN, and definition of a data structure of the two-dimension image code of step B According to an aspect of the invention, step D includes the identification of the user who accesses the service on the basis of the information given in step B.

According to an aspect of the invention, the writing off or cancellation of the last effected transaction occurs upon request of the paying party by the generation of a QR-code provided to the recipient party, which confirms the writing off or cancellation by authorization PIN, and wherein the two confirmation SMS confirm the effected writing off, guaranteeing to both parties the execution of the operation and the subsequent the restoration of the previous situation in the respective accounts.

According to an aspect of the invention, the two-dimension image code generated on the display of the reception payment mobile contains the user-ID retrieved from a "personal details" archive as well as information retrieved from an "operations" archive residing on the reception payment mobile phone.

According to an aspect of the invention, the two-dimension image code presented by the reception party mobile phone and captured by the payment mobile phone, provides as guarantee of the privacy the only user-ID of the recipient party, an operation number, the money amount, the payment mobile phone number.

According to an aspect of the invention, the payment mobile phone visualizes on the display the transaction money amount and requests the typing of the authorization PIN, extracts from a "personal details" archive the user-ID of the paying party, extracts from a "keys" archive the encryption key for the authorization PIN, encrypts the authorization PIN, composes an authorization SMS message and sends it to the server.

According to an aspect of the invention, the only payment mobile phone receives a SMS of refusal to effect the payment in case of a wrong PIN, blocked user profile, exceeding of an expense limit, funds shortage, lack of authorization from a bank and/or credit card system.

According to an aspect of the invention, the two-dimension image code is a QR code, "Quick response code".

According to an aspect of the invention, the payment of the money amount by remote transactions is possible, i.e. when the payment mobile phone is far away from the reception payment mobile phone, and wherein the paying party activates the transaction unilaterally by choosing among the receipt parties in a list, or by typing the mobile telephone number or the ID of the recipient party, the money amount to be credited, the payment reason and the authorization PIN.

According to another, further aspect of the invention, it is provided a system for transferring a money amount between a paying party and a recipient party by using a two-dimension image code, wherein a payment device of the paying party and a reception payment device of the recipient party are provided, as well as a server of money transfer managing entity, wherein:

said payment device and reception payment device are mobile phones both provided with a display and at least a camera, on the reception payment mobile phone a recipient party software module is installed, which is set up to create a two-dimension bar code;

on the payment mobile phone a paying party software module is installed, which is set up to analyze said two-dimension image code and to send to said server a SMS for authorization to payment of the money amount;

on the server of the money transfer managing entity there is:
  a managing software module which allows registration and management of new users, blocking and unblocking of transaction service, management of security parameters values and encryption keys, and manages a payment authorizing step, as well as a module managing the reception and sending of SMS, by means of a connection to a SMS forward device;
  a module managing the information exchange with gateways of a bank and/or credit card system;

said paying party software module, said recipient party software module and said managing software module being set up to execute the steps of the method according to an aspect of the invention.

According to an aspect of the invention, said paying party software module and said recipient party software module are present on both reception payment mobile phone and payment mobile phone, making both mobiles phones adapted to execute the role of paying party or recipient party indifferently.

BRIEF DESCRIPTION OF THE DRAWINGS

Further technical features and effects of the present disclosure will appear in greater detail in the following description, which is given by way of illustration and not by way of limitation, of aspects of the above method and system for transferring a money amount by using a two-dimension image code, with reference to enclose drawings, wherein.

In the figures, equal or similar reference numbers have be used to indicate equal or similar parts.

DETAILED DESCRIPTION

The method for the transfer of a money amount by using a two-dimension image code that allows two mobile phones to perform a selling/buying transaction or a fund transfer, in any place covered by a mobile telephone service, between accounts registered at a managing authority. The two mobile phones are registered on a control server wherein a suitable software module is installed; on the two mobile phones a modular software application has been installed beforehand, which is described in the following. The two mobile phones can perform indifferently and alternatively the selling or buying function, so that there will be a recipient party and a paying party; and therefore, the two mobile phones have the same module program application installed thereon. The privacy is guaranteed by the only use of a user unique identifier, that cannot traced back to the personal data of the user itself. To carry out the service, the use of further, additional software and hardware resources is provided, which are already in the market and described in the following.

Figure 1:
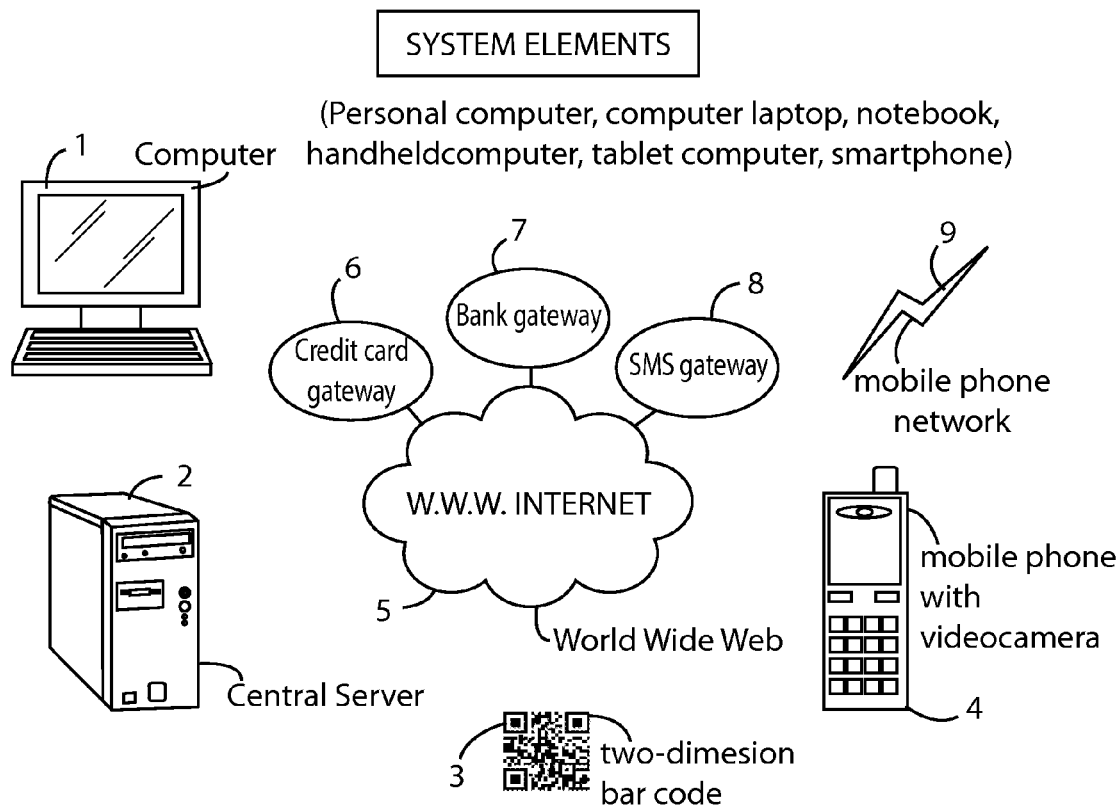
FIG. 1 is a schematic diagram of the components of the system for the transfer of a money amount according to an aspect of present disclosure.

Making reference to FIG. 1, which is a schematic view of the components for the system for the transfer of a money amount according to the present disclosure, it is indicated by 1 a computer or any other device that can be used for the web surfing and is provided with a display, such as a laptop, notebook, handheld computer, tablet computer, a smartphone.

With reference 2 a central server is indicated, which is placed at the managing entity end, the managing entity managing user accounts and in general the money transfers. On the central server 2, a suitable software application is installed, as described in the following. In the World Wide Web indicated by reference 5, a SMS Gateway 8 is provided, which allows the reception and transmission of a SMS. Alternatively to SMS Gateway 8, a SMS transmitter/receiver can be provided, i.e. a hardware device that can be connected to the central server 2. To execute the method according to present disclosure, a mobile telephone network indicated by reference 9 is needed, wherein mobile phones provided with video camera or even a simple camera operate, as the one indicated generically with reference 4 in FIG. 1. On the two mobile phones, a software application is installed which is described in the following and allows the access to the companies of the credit cards by a credit card Gateway 6, a further software interfacing the bank system by a bank system Gateway 7, and the World Wide Web 5. Still in FIG. 1, with reference 3 is indicated a 2-dimension image code, in the particular case a QR code (Quick Response Code).

The software applications developed exactly for the execution of the method according to the present disclosure are substantially:

A central module residing on the central server 2, which allows the registration and the users management, as well as blocking and unblocking of the service, management of the security parameters and encryption keys, and the authorization steps;

A SMS module residing on the central server 2, which manages the reception and transmission of necessary SMS messages through mobile telephone network 9, by means of information exchange with the SMS transmission module or SMS Gateway 8;

A mobile module residing on the mobile phone 4, which allows the capture and management of the two-dimension image code, utilized in the registration, selling and buying steps, which allows moreover the encryption and decryption of private data and the management of the SMS;

A bank module, residing on the central server 2, which manages the information exchange with the credit card Gateway 6 and, respectively, with the bank system Gateway 7.

The central module comprises a part dedicated to the management and verification of the user and a part relevant to the authorization step for the purchase or found transfer. The central module comprises also a SMS management module, that interfaces with at least a modem for the sending of SMS, and a bank module which manages the transaction according to the paying party request.

Figure 2:
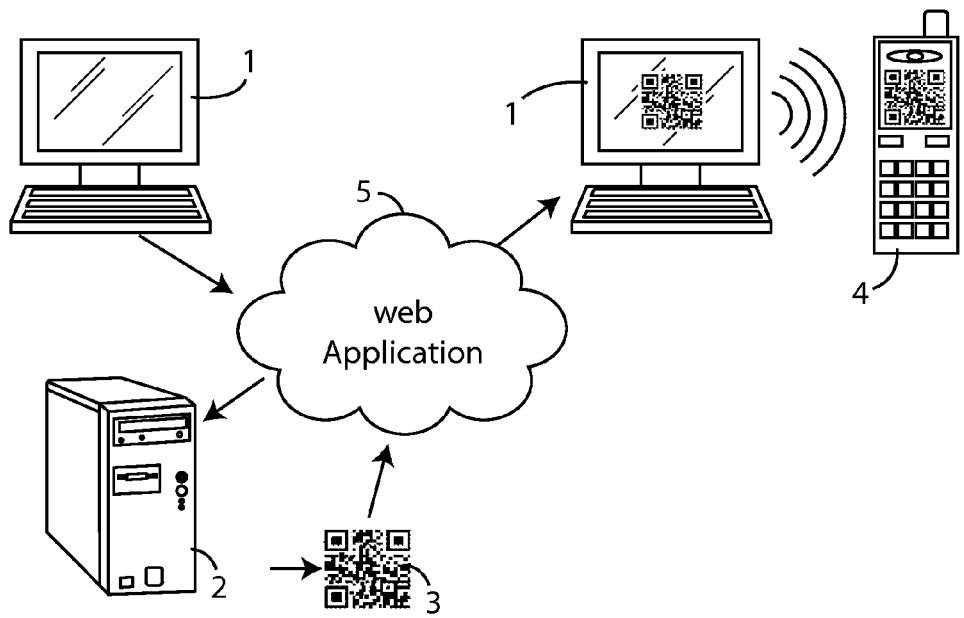
FIG. 2 is a block diagram of the user registration step in the method according to an aspect of the present disclosure.

One makes now reference to FIG. 2, which is a block diagram of the user registration step in the method according to the present disclosure. The request coming from computer 1 or other user device, which registered itself to the service, reaches the management central server 2 through the World Wide Web 5. It comprises the following steps:

generation of a unique code called user-ID;
definition of the in personal data;
definition of the account data and payment modes;
definition of the limit of the single transaction;
user account type (prepaid or credit card);
main mobile telephone number associated with the service;
request of an ID-SMS use for validating the SMS during the authorization step;
request of an alteration code and an alteration method chosen by the user, which will be used to create the PIN of the payment transactions (authorization PIN) or of funds transfer and to encrypt the PIN encryption key;
providing a further PIN utilized exclusively during the installation of the application on the mobile phone;
generation of a random key to protect the PIN;
definition of the two-dimension image code 3 containing the registration data.

Briefly, the central server 2 registers the new user and generates a key to encrypt the PIN for payment transaction, by a two-dimension image code 3. Alternatively, the data will be downloaded on the mobile phone together with the application, comprised in a security archive exactly utilized for their installation.

The data are typed in a secure web environment, and the two-dimension image code 3 is sent through the World Wide Web 5 again to the user and to the screen of his computer 1, in order that it can be captured directly by the video camera or camera of the mobile phone 4 of the (other) user. The application, i.e. the mobile phone software module on the mobile phone 4 of the user, decrypts and registers the received data. The data cannot be intercepted since the not visible. Once the image is captured, the keying of the code and alteration method on the mobile phone is requested; in such a way, the user who has input the information on the central server 2 is only able to acquire them correctly on the mobile phone. By using the mode with security archive, a further numerical code will be provided that can be used only one time and will allow the activation of the application.

The user, by connecting to the webpage of server, can decide autonomously, for as many times as he wishes, to block and unblock the account and the relevant profile, to change the security codes and the entered data. He can moreover look through the balance of his account and the list of the carried-out operations.

Figure 3:
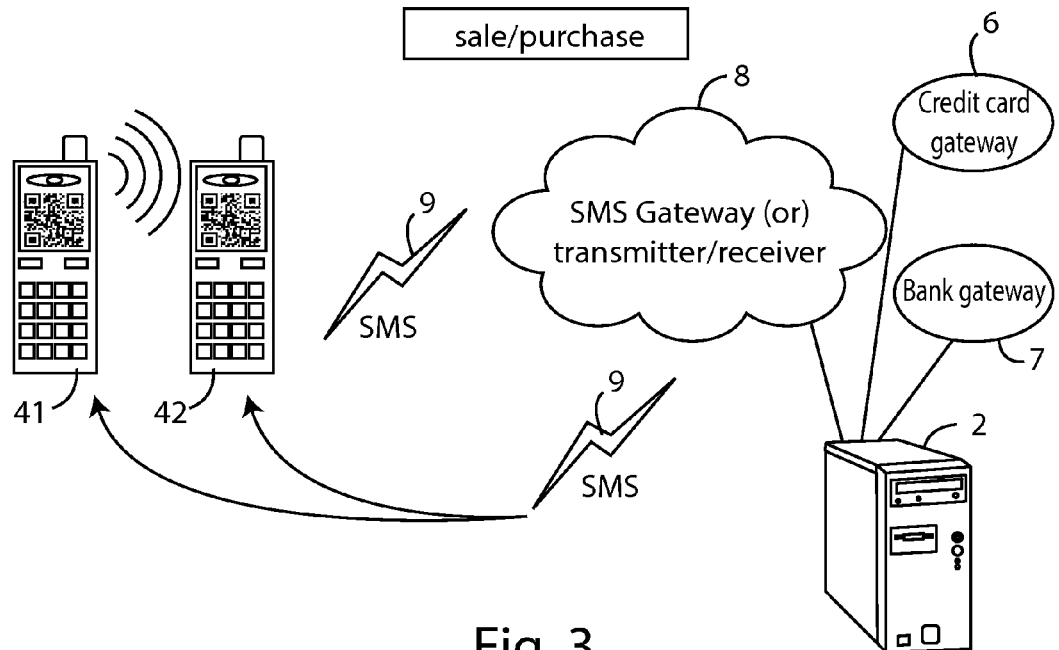
FIG. 3 is a block diagram of the transfer of a money amount between users in the method according to an aspect of the present disclosure.

With reference to FIG. 3, which is a block diagram of the operation of money amount transfer between users according to the present disclosure, the authorization step during the sale or purchase-step, or generically the step of transferring a money amount between two users is illustrated.

With reference 41, the mobile phone of a first user, cellular or recipient party is indicated, whilst with 42 to mobile phone of a second user, buying or paying party is indicated.

The seller sets the purchase price on his mobile phone 41 and by means of his mobile software module generates the two-dimensional image code containing his identifier and the amount that is visualized on the display of the mobile phone 41.

The buyer captures the two-dimension image code by the camera of his mobile phone 42, whereon the same mobile software module is installed. The money amount of the transaction is visualized and the authorization PIN needed for the authorization is required. In the mode with security archive, the verification of the authorization PIN provides that the authorization PIN travels within the SMS sent by the buyer, the data are all encrypted of course. An encrypted SMS is then sent from the mobile phone 42 through the mobile telephone network 9.

The central server 2 receives the request by SMS from the mobile phone 42, decrypts the SMS and forwards the authorization request to the bank Gateway 7 or credit card Gateway 6, depending on the gateway specified by the user during the registration step, or it authorizes locally if the account type is a prepaid account.

More in detail, by verification of the format of the received data, the software on the central server 2 accesses the user archive. If the profile is blocked, it denies the service; otherwise the software module on the client side retrieves the security parameter values, and decrypts and verifies the authorization PIN (if the remote verification is provided).

In case of negative issue of the authorization PIN verification, it sends a SMS through the SMS module. The SMS contains the caption "wrong PIN" and at the third attempt, it blocks the account.

In case of a positive issue of the authorization PIN verification, in presence of prepaid account, the software on the central server 2 verifies the expense limit and the availability of the account, and authorizes or not the payment on the basis of the carried-out controls.

In case of positive issue of the authorization PIN verification, in presence of an account that is external or associated to a credit or debit card, it forwards the request through the bank module to the Gateway 7 of the bank system that carries out the payment, receives the response and sends a positive or negative SMS on the basis of the received response.

The transactions are univocally and progressively numbered and stored, as well as verifications are carried out; possible anomalies trigger the temporarily block of the service.

Once the operation is carried out, the central server 2 sends two SMS, one to the mobile phone 41 of the seller and the other one to the mobile phone 42 of the buyer, for confirming or denying the transaction.

With the same modes of the authorization step, the writing off or the cancellation of the last carried-out operation is provided. The initiative starts always from the buyer which produces a suitable bar code and is confirmed by the seller by means of the authorization PIN and the sending of an encrypted SMS. The arrival of the two SMS indicating the effected writing off guarantees to both parties the execution of the operation and the subsequent restoration of the previous situation on both accounts.

It is provided the reception of a service block/restoration SMS, on the remote initiative of the client.

The SMS module acquires from SMS reception device (the above-mentioned at least a modem, for example) or from the Gateway 8 the incoming messages and writes them in a "requests" archive, reads from "responses" archive the outgoing messages and forwards them to be SMS sending device (the above-mentioned at least a modem, for example) or to the Gateway 8.

The bank module receives from the Gateway 7 of the bank system the top-up orders, normally bank transfer orders, in the prepaid user account, forwards the authorization requests in case of an account associated to credit or debit cards to the gateway 6 of the credit card companies or bank system, receives the authorizations or refusals to the service execution.

Figures 4, 5, 6:
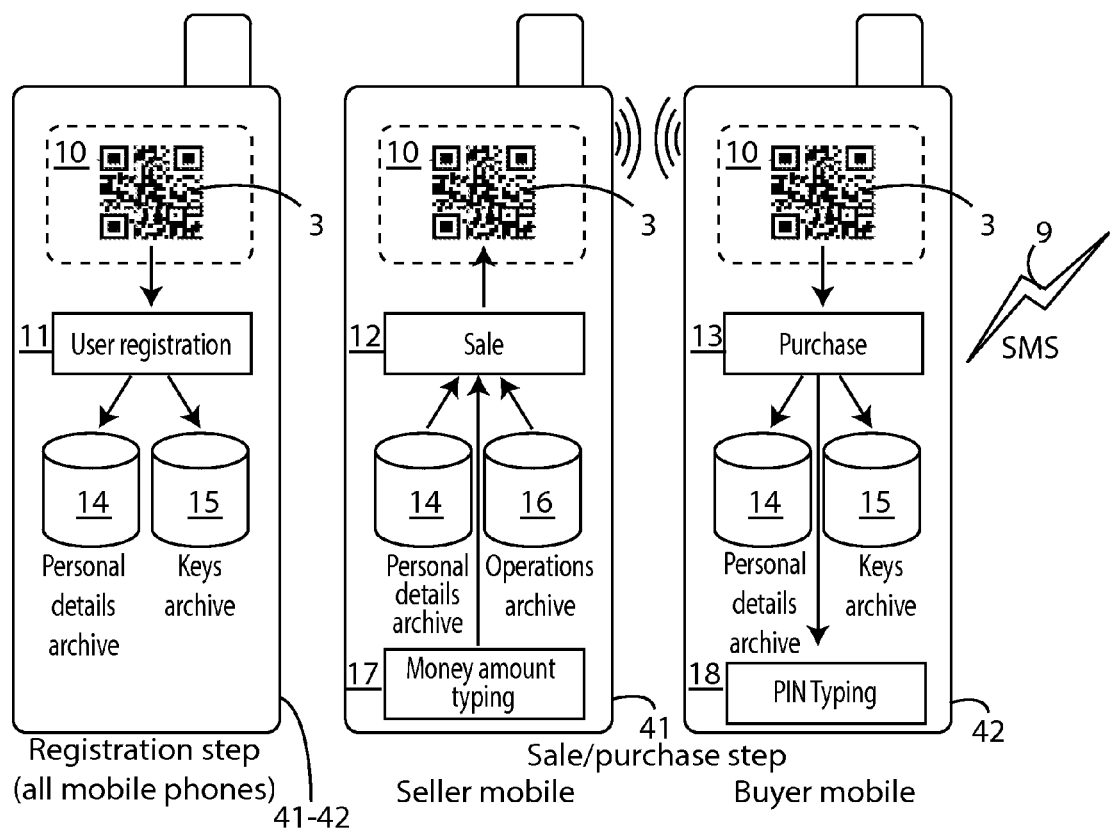
FIG. 4 is a block diagram of the user registration step in the mobile phone in the method according to an aspect of the present disclosure.
FIG. 5 is a block diagram of the selling step in the mobile phone of the recipient party in the method according to an aspect of the present disclosure.
FIG. 6 is a block diagram of the buying step in the mobile phone of the paying party in the method according to one aspect of the present disclosure.

Making now reference to FIG. 4, which illustrates the registration data acquisition step for the user registration to the service, as contained in the QR-code, and FIGS. 5 and 6, which illustrate the sale operation in the mobile phone of the recipient party and, respectively, the operation of purchase in the mobile phone of the paying party are shown according to another aspect of the method according to the present disclosure.

For the user registration, the user acquires on the display 10 of the mobile phone 41 or 42 the two-dimension image code 3 from the software module of the central server 2. The registration is carried out, wherein the alteration number (arbitrarily chosen by the user) and the alteration method (that the user chooses in a web page dedicated to the registration to the service) are decrypted and saved in a "personal details" archive 14 and a "keys" archive 15.

The mobile phone 41 (FIG. 5) of the seller requires in block 17 the typing of the money amount that he should receive, generates the image code containing the user-ID retrieved from the "personal details" archive 14, besides some information that characterize the transaction and are retrieved from a "operations" archive 16 and prepares in the sale block 12 the image prepared on the display 10 of the mobile phone 41.

The mobile phone 42 of the buyer, by means of video camera or camera, captures the image visualized on the mobile phone 41 of the seller, extracts from it the user-ID of the seller, the operation number and the money amount (charge), visualizes on the display the charge of the operation and requires the typing of the authorization PIN in purchase block 13, extracts from the "personal details"

archive 14 the user-ID of the buyer, extracts from the "keys" archive 15 the decryption key of the authorization PIN. In the mode with security archive, the verification of the authorization PIN is carried out on the mobile phone, otherwise it is encrypted and sent with the SMS of authorization request. Then, it composes the SMS message and sends it to the central service 2.

Both the mobile phones 41 and 42 receive in any case a SMS that confirms or refuses the required operation.

The only buyer mobile phone 42 receives a SMS in the following cases: wrong PIN, blocked profile, blocked account, exceeding of the expense limit, fund shortage, absence of authorization by the bank system and credit card systems.

In case of wrong PIN, a new typing is requested, for a total of three attempts, with subsequent sending of a new SMS. At the end of the three attempts, there is a blocking of the user workability in the central server.

With the same modes of the authorization step, the writing off or cancellation of the last carried-out operation is provided, the initiative starts always from the buyer, who produces a suitable bar code and is confirmed by the seller by PIN and a SMS to the server. The reception by the two mobile phones of the two SMS of effected writing off guarantees to both parties the execution of the operation and the subsequent restoration of the preceding situation on the accounts of both ones.

Both the mobile phones can, by using a provided function, send a SMS to block or unblock the service. They can moreover interrogate the transactions archive and know the balance or delays of the effected operations, both for purchases and sales.

In an aspect of the disclosure, it is possible the function of remote payment. It will be activated in one-sided way by the paying party, by choosing among the recipient parties in a list, or by typing the telephone number or the ID of the recipient party, the charge to be credited, the reason for payment and the PIN. The sending of the request SMS and the notification of the operation (always by SMS) will occur according to the modes already described for the other embodiments.

One understands technical effects of the present disclosure. Once two users are registered at a money transfer managing entity, a transfer can occur between one user and another one, which utilizes the mobile telephone network, a mobile phone provided with video camera or camera and the use of a two-dimension image code. Even if in the foregoing and in the drawings a QR code is cited and shown, another type of two-dimension image code can be used alternatively. The transmission of this code containing all the data for a secure transaction is sufficient to make it possible, without the availability of a POS of the recipient party and without the presentation of a credit card of the paying party.

This new system composed by a server engine and two mobile phones, leads to dematerialization of the POS, which represented a constraint for the utilization of the credit cards.

By this new system/method, the POS and the cards can be completely substituted and each customer can, with an only device, carry out the functions of POS (sale) and card (purchase). Moreover, the payment tool is in the hands of the paying party (buyer), whilst with the credit card the seller has the payment tool (the same credit card) for the payment itself.

All this would have never been possible with the POS and credit cards, since these are systems that are not designed to allow a different use.

By the present system money transactions ever occurs, however the today's barriers and constraints disappear, which oblige two entities (seller and buyer) to have POS and card close to each other to effect an electronic money transaction.

It is therefore clear that it is easy for the customer to own a card, whilst it is more difficult to have a POS. This is the reason for which one frequently uses cash money, for goods and/or services purchases.

Since the mobile phone use used by all persons for other aims, this new system is well suited to substitute both POS and card for each customer. All this is not possible in the prior art, wherein the system is composed by a POS, a mobile phone and a payment engine. In the prior art, credit cards, debit cards, current accounts have been dematerialized and regrouped in an only device (mobile phone), however the presence of the POS remains still a constraint for the whole system in the prior art.

In the prior art, a rigidity of the system remains, because each actor of the process (buyer and seller) can play an only role in the transaction. Such a constraint can be removed only if the customer moves, bringing with himself mobile phone and POS; all this appears unlikely.

From the above concepts, one understands the importance of the present disclosure with respect to what is available on the market till today.

Figure 7:
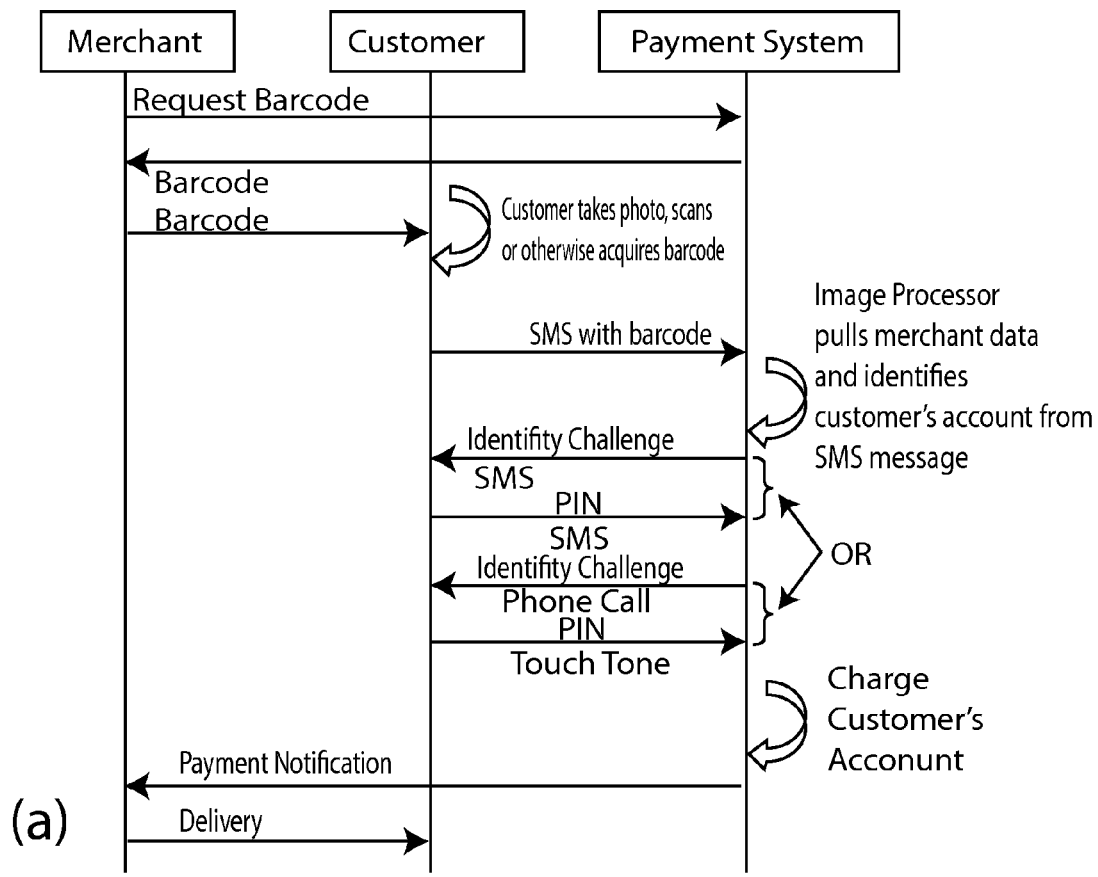
FIG. 7(a) and FIG. 7(b) show respectively FIG. 3 of US2008222048 and a diagram of an aspect of the present disclosure.
Figure 7:
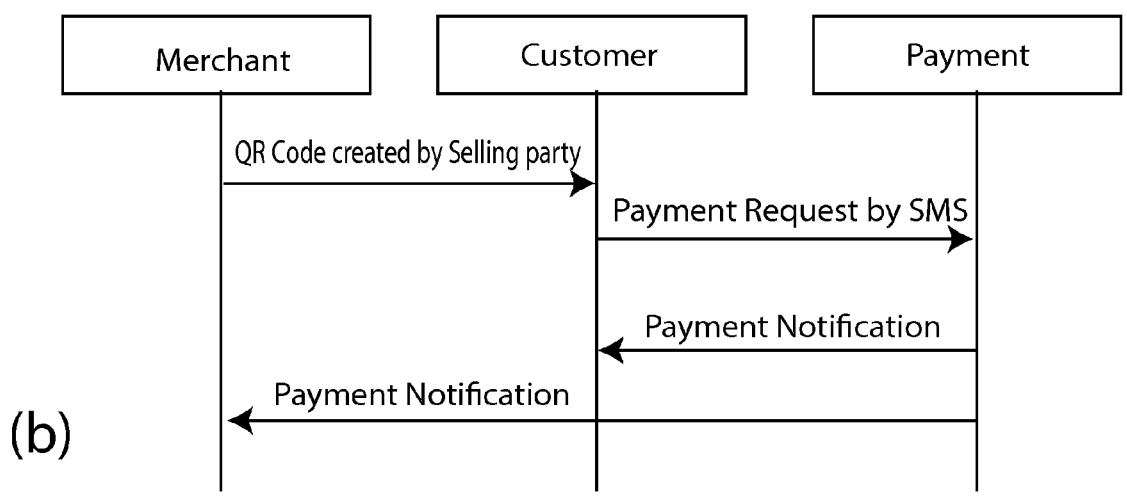

Indeed, making reference to FIGS. 7(a) and 7(b), one observes the difference of the system of above-mentioned US2008222048. In the case of the present disclosure, the seller communicates only with the buyer; the latter is the only one that sends data to the central server. In such a way, the overload of the server is avoided, because for each transaction and only message is sent to the server, instead of the two messages of US2008222048, with the additional advantage to be able to use a mobile phone instead of the POS.

Form the above concepts, one understands the importance of the present disclosure with respect to what is today available on the market.

A number of embodiments of the disclosure have been described. Nevertheless, it will be understood that various modifications can be made without departing from the spirit and scope of the present disclosure. Accordingly, other embodiments are within the scope of the following claims.

What is claimed is:

1. Method for transferring a money amount by using a two-dimension image code between a paying party provided with a payment device and a recipient party provided with a reception payment device, comprising:
   A. Registration of both paying party and recipient party at a money transfer managing entity on a server, which provides for the management and verification of the paying party and recipient party and is responsible of the authorization to the transfer of money amounts and their payment;
   B. Request of the recipient party to the paying party of a money amount, executed between the reception payment device and the payment device;
   C. order from the paying party to the money transfer managing entity to pay said money amount to the recipient party, after the insertion of a authorization PIN in the payment device and information communication from the payment device to the server;
   D. authorization of the payment from the transfer managing entity to the recipient party, with information communication from the server to the reception payment device;

E. payment of said money amount to the recipient party and sending of a confirmation information of effected money amount transfer to the payment device and reception payment device concerning the effected payment of the money amount, or possible writing off or cancellation of an already effected payment operation;

wherein said payment device and said reception payment device are smart phones, and in that:

a recipient party program module and a paying party program module are installed on both smartphones;

in step B, the recipient party generates a two-dimension image code that is visually displayed on a display of a reception payment smartphone;

in step B, the payment smartphone of the paying party captures, by said paying party program module installed on said payment smartphone the two-dimension image code from the display of the reception payment smartphone;

in step C, the paying party sends to the server via the payment smart phone an encrypted authorization SMS message, the encrypted authorization SMS message including data contained in the two-dimension image code, comprising the indication of said money amount, in step D, the server receives said encrypted authorization SMS message and authorizes or not the payment of the money amount, wherein, in step B, the reception payment smart phone of the recipient party provides only the visualization of said two-dimension code to said payment smartphone, and the visualization of said two-dimension code is provided by the reception payment smart phone without sending any relevant information to the server.

2. Method according to claim 1, wherein, in case of authorization to the payment in step D, the server sends a confirmation of effected payment by means of two confirmation SMS, one directed to the payment smartphone and the other one directed to the reception payment smartphone.

3. Method according to claim 1, wherein the registration of step A of the paying party and the recipient party on the server of the money transfer managing entity includes the generation by the server of relevant unique codes called user-ID and assigned to the same paying party and recipient party, the definition of personal details data, account data, payment modes and payment limits, the type of user account, i.e. prepaid or credit card, the request of a ID-SMS utilized for validating the authorization SMS during the authorization to the payment, definition of an alteration code to generate an authorization PIN and an alteration method used to encrypt a protection key for the PIN, generation of a random key to protect the PIN, and definition of a data structure of the two-dimension image code of step B.

4. Method according to claim 1, wherein step D includes the identification of the user who accesses the service on the basis of the information given in step B.

5. Method according to claim 2, wherein the writing off or cancellation of the last effected transaction occurs upon request of the paying party by the generation of a QR-code provided by the server to the recipient party, which confirms the writing off or cancellation by authorization PIN, and wherein the two confirmation SMS confirm the effected writing off, guaranteeing to both parties the execution of the operation and the subsequent restoration of the previous situation in the respective accounts.

6. Method according to claim 1, wherein the two-dimension image code generated on the display of the reception payment smartphone contains the user-ID retrieved from a "personal details" archive as well as information retrieved from an "operations" archive residing on the reception payment mobile phone.

7. Method according to claim 1, wherein the two-dimension image code presented by the reception payment smart phone and captured by the payment smartphone, provides as guarantee of the privacy the only user-ID of the recipient party, an operation number, the money amount, the payment smartphone number.

8. Method according to claim 7, characterized in that the payment smartphone visualizes on the display the transaction money amount and requests the typing of the authorization PIN, extracts from a "personal details" archive the user-ID of the paying party, extracts from a "keys" archive the encryption key for the authorization PIN, encrypts the authorization PIN, composes an authorization SMS message and sends it to the server.

9. Method according to claim 1, wherein the only payment smartphone receives a SMS of refusal to effect the payment in case of a wrong PIN, blocked user profile, exceeding of an expense limit, funds shortage, lack of authorization from a bank and/or credit card system.

10. Method according to claim 1, wherein the two-dimension image code is a QR code, "Quick response code".

11. Method according to claim 1, wherein the payment of the money amount by remote transactions is possible, when the payment smartphone is far away from the reception payment smartphone, and wherein the paying party activates the transaction unilaterally by choosing among the recipient parties in a list, or by typing the smartphone number or the ID of the recipient party, the money amount to be credited, the payment reason and the authorization PIN.

12. System for transferring a money amount between a paying party and a recipient party by using a two-dimension image code, wherein a payment device of the paying party and a reception payment device of the recipient party are provided, as well as a server of money transfer managing entity, wherein:

said payment device and reception payment device are smartphones both provided with a display and at least a camera, on the reception payment smartphone a recipient party software module is installed, which is set up to create a two-dimension bar code;

on the payment smart phone a paying party software module is installed, which is set up to analyze said two-dimension image code and to send to said server a SMS for authorization to payment of the money amount;

on the server of the money transfer managing entity there is:

a managing software module which allows registration and management of new users, blocking and unblocking of transaction service, management of security parameters values and encryption keys, and manages a payment authorizing step, as well as a module managing the reception and sending of SMS, by means of a connection to a SMS forward device;

a module managing the information exchange with gateways of a bank and/or credit card system;

said paying party software module, said recipient party software module and said managing software module being set up to execute the steps of the method according to claim 1.

13. System according to claim 12, wherein said paying party software module and said recipient party software module are present on both reception payment smartphone and payment smartphone, making both smartphones adapted to execute the role of paying party or recipient party indifferently.

* * * * *